United States Patent
Naito

(10) Patent No.: US 7,953,179 B2
(45) Date of Patent: May 31, 2011

(54) PEAK SUPPRESSING OFDM TRANSMITTER

(75) Inventor: Masashi Naito, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 577 days.

(21) Appl. No.: 12/149,435

(22) Filed: May 1, 2008

(65) Prior Publication Data
US 2008/0292014 A1   Nov. 27, 2008

(30) Foreign Application Priority Data
May 22, 2007   (JP) .................. 2007-135210

(51) Int. Cl.
*H04L 25/49* (2006.01)
(52) U.S. Cl. ........................ 375/296; 375/297
(58) Field of Classification Search .................. 375/285, 375/295–297, 316, 344, 346, 345; 455/63.1, 455/136; 332/107, 123, 163, 319, 349; 370/203, 370/208
See application file for complete search history.

(56) References Cited

U.S. PATENT DOCUMENTS
2008/0207142 A1 *  8/2008  Numakunai .................. 455/101
2008/0285432 A1 * 11/2008  Ueng et al. .................... 370/203
* cited by examiner

*Primary Examiner* — Tesfaldet Bocure
(74) *Attorney, Agent, or Firm* — Wenderoth, Lind & Ponack, L.L.P.

(57) ABSTRACT

Communication equipment transmits signals of an OFDM system while effectively suppressing peaks in the transmission. OFDM signals are formed and peaks of the OFDM signals are suppressed. The OFDM signals of which the peaks are suppressed are converted into intermediate-frequency signals, and peaks of the intermediate-frequency signals are suppressed. Additionally, the intermediate-frequency signals of which the peaks are suppressed are synthesized and the signals having been synthesized are amplified. The peaks of the OFDM signals are suppressed with the synthesized value of the absolute values of the OFDM signals as an estimated peak value, and the peaks of the intermediate-frequency signals are suppressed with the absolute value of the result of synthesizing the intermediate-frequency signals as an estimated peak value.

2 Claims, 6 Drawing Sheets

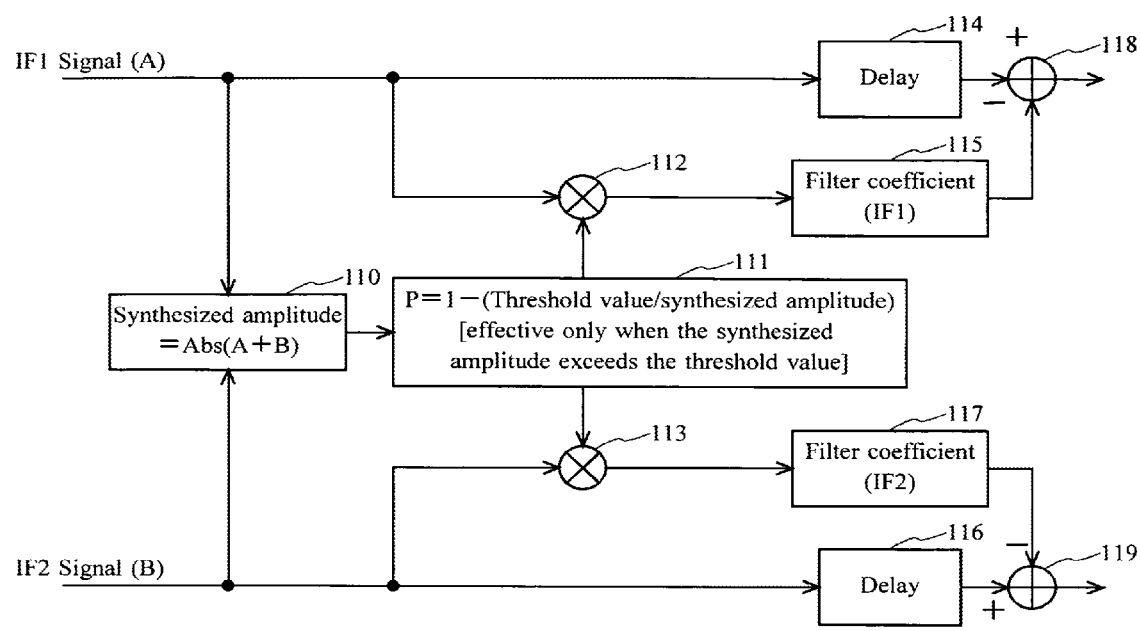
PRIOR ART    Fig.7

PEAK SUPPRESSING OFDM TRANSMITTER

BACKGROUND OF THE INVENTION

1. Field of the Invention

This invention relates to a communication equipment that uses an OFDM (orthogonal frequency division multiplexing) system and, particularly, to a communication equipment which effectively suppresses peaks in the transmission.

2. Description of the Related Art

Signals are communicated by using the OFDM system in a mobile station equipment such as a cell phone in a mobile communication system, in a base station equipment that communicates with the mobile station equipment and in a communication station equipment in a digital television (TV) broadcast system.

FIG. 6 illustrates the constitution of an OFDM transmitter provided in a radio communication equipment, which is the constitution of a conventional multi-carrier synthesizing transmitter with a peak suppressing function (peak limiter). In this conventional example, the OFDM signals of the two carriers are synthesized.

The OFDM transmitter of this conventional example includes two OFDM modulators 101 and 102, two intermediate-frequency (IF) converter circuits 103 and 104, a peak-suppressing circuit 105 that receives two carrier OFDM signals and suppresses the peaks, a synthesizer 106, a radio frequency (RF) converter unit 107, a transmission amplifier (transmission AMP) 108 and an antenna 109.

Here, the constitution and operation of the OFDM transmitter of this conventional example are different from those shown, for example, in FIG. 1 with respect to that no BB peak suppressing circuit 3 is provided, but are roughly the same as those of FIG. 1 concerning other constitution and operation.

FIG. 7 illustrates the constitution of a conventional multi-carrier synthesizing peak-suppressing circuit 105.

The peak-suppressing circuit 105 of this conventional example includes a synthesized amplitude operation circuit 110, a peak suppress value operation circuit 111, two multiplier circuits 112 and 113, two delay elements 114 and 116, two filters 115 and 117, and two subtractor circuits 118 and 119. These circuits are all digital circuits.

Though this conventional example illustrates a constitution for transmitting two carriers, three or more carriers can be transmitted by adding the same circuits in a number corresponding to the number of carriers to be transmitted. When one carrier is to be transmitted, the number of circuits can be decreased down to, for example, one. In the constitution of FIG. 7, however, the circuit can be operated without any change by inputting no signal to the carrier side where there is no input.

Described below is the operation of the peak-suppressing circuit 105 of this conventional example.

An IF1 signal (A) and an IF2 signal (B) which are OFDM signals of one carrier having different center frequency in the IF are input through the IF converter circuits 103 and 104 of each of the series, and are separately compressed for their peaks based on their predetermined synthesized amplitudes. The two IF signals are, respectively, input as digital complex signals having an I (in-phase) component and a Q (quadrature-phase) component.

The synthesized amplitude operation circuit 110 finds a synthesized amplitude after having synthesized the vectors of the IF1 signal (A) and the IF2 signal (B) input through the IF converter circuits 103 and 104, and outputs the synthesized amplitude to the peak suppress value operation circuit 111. Here, the synthesized amplitude of this conventional example becomes an absolute value (Abs) obtained by synthesizing the IF1 signal (A) and the IF2 signal (B) together, and is expressed by the formula (1), $$\text{Synthesized amplitude} = Abs(A+B) \quad (1)$$

The peak suppress value operation circuit 111 compares a value of the synthesized amplitude obtained by the synthesized amplitude operation circuit 110 with a value set by a limiter, executes the operation of the formula (2) when the value of the synthesized amplitude exceeds a threshold value, and outputs the obtained value P to the multiplier circuits 112 and 113. When the value of the synthesized amplitude does not exceed the threshold value, the peak suppress value operation circuit 111 outputs the value 0 to the multiplier circuits 112 and 113.

$$P = 1 - (\text{threshold value}/\text{synthesized amplitude}) \quad (2)$$

The multiplier circuits 112 and 113 of each of the series multiply the IF signals (IF1 signal (A) and IF2 signal (B)) from the IF converter circuits 103 and 104 of each of the series by the value (P or 0) from the peak suppress value operation circuit 111, and output the multiplied results to filters 115 and 117 of each of the series.

The filters 115 and 117 of each of the series have complex tap coefficients and, as frequency characteristics of the filters, have coefficients with the band of OFDM transmitted-signals of different intermediate frequencies as a pass band. The filters 115 and 117 of each of the series work to filter the signals input from the multiplier circuits 112 and 113 of each of the series, and output them to the subtractor circuits 118 and 119 of each of the series.

The delay elements 114 and 117 of each of the series correct the delay of processing by the filters 115 and 117 of each of the series, delay the IF signals (IF1 signal (A) and IF2 signal (B)) from the IF converter circuits 103 and 104 of each of the series, and output them to the subtractor circuits 118 and 119 of each of the series.

The subtractor circuits 118 and 119 of each of the series subtract impulse response signals from the initial IF signals (IF1 signal (A) and IF2 signal (B)) input from the delay elements 114 and 116 of each of the series, the impulse response signals being the ones obtained by multiplying, by a band limit of transmitted signals, the sample signals that are input from the filers 115 and 117 of each of the series and are to be suppressed for their peaks. The subtraction circuits 118 and 119 output the subtracted results to the synthesizer 106. The output signals to the synthesizer 106 are the ones of which the peaks are suppressed while holding the band of the transmitted signals.

In this example, the value P is multiplied by the sample of which the peak is to be suppressed for each of the carriers. Therefore, even if the carrier levels are not balanced causing a difference in the transmitted electric power between the carriers, the multiplier circuits 112 and 113 so work (as to evenly) distribute peak suppress signals to each of the carriers depending upon the transmission levels, making it possible to nearly uniform the EVM (error vector magnitude) which is a distortion scale for evaluating the quality of the transmitted signals between the carriers so as to be adapted to the carrier levels that are lacking balance.

In the OFDM transmitter of this conventional example as described above, the peak-suppressing signals are limited for their band making it possible to maintain frequency characteristics of the transmitted signals and to suppress the peak satisfying the standard of transmission spectrum.

Patent document 1: European patent No. 1469649

However, the OFDM signal has a large peak to average power ratio (PAPR) and requires a large peak-suppressing amount for improving the efficiency of the transmission amplifier. On the other hand, the modulation system in many cases uses a multi-value modulation system like 64 QAM (quadrature amplitude modulation) for transmitting data at high speeds and, therefore, the transmitted signals must satisfy the standards of transmission frequency characteristics yet maintaining the EVM low and maintaining a large peak-suppressing amount. In the conventional OFDM transmitter, however, if it is attempted to increase the peak-suppress amounting, a problem occurs in that the deterioration in the EVM is not avoidable. To realize equipment, further, a problem remains concerning how to decrease the scale of the circuit.

SUMMARY OF THE INVENTION

The present invention was accomplished in view of the above-mentioned circumstances and has an object of providing a communication equipment capable of effectively suppressing peaks in the transmission.

Concretely, the invention provides a technology of suppressing the peaks satisfying, for example, the standards of transmission frequency characteristics as well as satisfying all of the requirements of low PAPR, less deterioration in the EVM and a small increase in the scale of circuit.

In order to attain the above object, the communication equipment for transmitting signals of the OFDM system of the invention is constituted as described below.

That is, forming means forms a plurality of OFDM signals. Peak-suppressing means of a base band (BB) suppresses peaks of the OFDM signals based on the plurality of OFDM signals formed by the forming means. IF converter means converts the OFDM signals of which the peaks are suppressed by the peak-suppressing means of the base band into signals of the intermediate frequency (IF frequency). The peak-suppressing means of the intermediate frequency suppresses the peaks of intermediate-frequency signals based on a plurality of intermediate-frequency signals converted by the IF converter means. Synthesizing means synthesizes the signals of the plurality of intermediate-frequency signals of which the peaks are suppressed by the peak-suppressing means of the intermediate frequency. Amplifier means amplifies the signals after synthesized by the synthesizing means.

The peak-suppressing means of the base band suppresses the peaks with the synthesized value of absolute values of the OFDM signals as an estimated peak value. The peak-suppressing means of the intermediate frequency suppresses the peaks with the absolute value of the result of synthesizing a plurality of intermediate-frequency signals as an estimated peak value.

Therefore, the peaks in the transmission can be effectively suppressed.

The communication equipment of the invention is constituted as described below.

That is, in the peak-suppressing means of the base band, suppressing amount-forming means forms a peak-suppressing amount for the OFDM signals based on the plurality of OFDM signals. Further, filter means limits the frequency band of the peak-suppressing amounts formed by the suppressing amount-forming means. Subtraction means subtracts, from the OFDM signals, the peak-suppressing amounts of which the frequency bands are limited by the filter means.

The filter means has such frequency characteristics that a gap between the frequency band possessed by the OFDM signals and the standard of transmission frequency is used as a chief pass frequency band.

Therefore, the peaks in the transmission can be effectively suppressed.

Here, as the communication equipment, a radio-frequency communication equipment is used transmitting multi-carrier signals comprising signals of a plurality of carriers without wires.

Further, as means for forming the OFDM signals of each of the carriers, there can be used, for example, an IFFT (inverse fast Fourier transform) circuit and a CP (cyclic prefix)-imparting circuit.

Between the synthesizing means and the amplifier means, further, an RF converter means may be provided to convert signals synthesized by the synthesizing means into radio-frequency (RF) signals.

As the synthesized value of absolute values of the OFDM signals used in the peak-suppressing means of the base band, the amplitudes of the OFDM signals are found and are added up.

As the absolute value of the result of synthesizing the plurality of intermediate-frequency signals used in the intermediate-frequency peak-suppressing means, for example, the plurality of intermediate-frequency signals are synthesized and the amplitude of the synthesized signals is used.

Various frequency characteristics can be employed in order to use the gap between the frequency band possessed by the OFDM signals used in the filter means in the peak-suppressing means of the base band and the standard of transmission frequency as a chief pass frequency band. For example, the signal power of the frequency band occupied by the OFDM signals (frequency band in which effective sub-carriers are present) may be suppressed to be small and a high signal power may be concentrated in a frequency band in the gap between the frequency band possessed by the OFDM signals and the standard of transmission frequency.

According to the transmission equipment of this embodiment as described above, in transmitting multi-carrier signals by the OFDM system, the base-band signals are suppressed for their peaks based on the synthesized result of absolute values of the plurality of OFDM signals (base-band signals) while the intermediate-frequency signals are suppressed for their peaks based on the absolute value of the result of synthesizing the plurality of OFDM signals (intermediate-frequency signals) to effectively suppress the peaks in the transmission.

BRIEF DESCRIPTION OF THE DRAWINGS

FIG. 7 is a diagram illustrating the constitution of a peak-suppressing circuit of the multi-carrier synthesizing type.

DETAILED DESCRIPTION OF THE INVENTION

Figure 1:
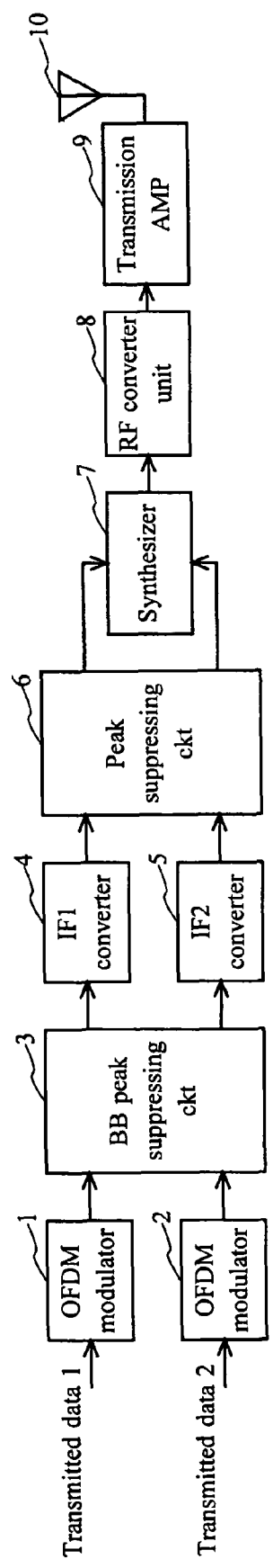
FIG. 1 is a diagram illustrating the constitution of an OFDM transmitter according to an embodiment of the present invention.

FIG. 1 illustrates the constitution of an OFDM transmitter provided in a radio-frequency communication equipment according to an embodiment of the invention, i.e., illustrates the constitution of a transmitter with a peak-suppressing function (peak limiter) of the multi-carrier synthesizing type. The constitution in this case is for synthesizing OFDM signals of the two carriers.

The OFDM transmitter of this example includes two OFDM modulators 1 and 2, a base-band (BB) peak-suppressing circuit 3 which receives the OFDM signals of two carriers and suppresses the peaks thereof, two intermediate-frequency (IF) converter circuits 4 and 5, a peak-suppressing circuit 6 which receives the OFDM signals of two carriers and suppresses the peaks thereof, a synthesizer 7, a radio-frequency (RF) converter unit 8, a transmission amplifier (transmission AMP) 9, and an antenna 10.

Here, in this example, the constitution and operation of the peak-suppressing circuit 6 are the same as those shown in FIG. 7.

Described below is the operation carried out in the OFDM transmitter of this embodiment.

The transmitted data (transmitted data 1, transmitted data 2) of two series are input to the OFDM demodulators 1 and 2 of each of the series.

The OFDM modulators 1 and 2 of each of the series convert the transmitted data that are received into OFDM signals, and output them to the BB peak-suppressing circuit 3.

Based on the OFDM signals from the OFDM modulators 1 and 2 of each of the series, the BB peak-suppressing circuit 3 estimates a synthesized amplitude thereof, suppresses peak values in excess of a first threshold value for each of the series and outputs them to the IF converter circuits 4 and 5 of each of the series.

The IF converter circuits 4 and 5 of each of the series up-sample the peak-suppressed OFDM signals of each of the series from the BB peak-suppressing circuit 3, convert them into signals of different intermediate frequencies (IF1 and IF2), and output them to the peak-suppressing circuit 6.

Based on the signals input from the IF converter circuits 4 and 5 of each of the series, the peak-suppressing circuit 6 estimates the amplitude of the synthesized signals thereof, suppresses the peak values in excess of the second threshold value for each of the series and outputs them to the synthesizer 7.

The synthesizer 7 synthesizes the peak-suppressed signals of each of the series from the peak-suppressing circuit 6 to form a multi-carrier signal and outputs it to the RF converter unit 8.

The RF converter unit 8 converts the multi-carrier signal from the synthesizer 7 into an RF signal and outputs it to the transmission amplifier 9.

The transmission amplifier 9 amplifiers the power of the signal input from the RF converter unit 8 and outputs it to the antenna 10.

The antenna 10 radiates the signals input from the transmission amplifier 9 into space, i.e., radio-transmits the signals.

Figure 2:
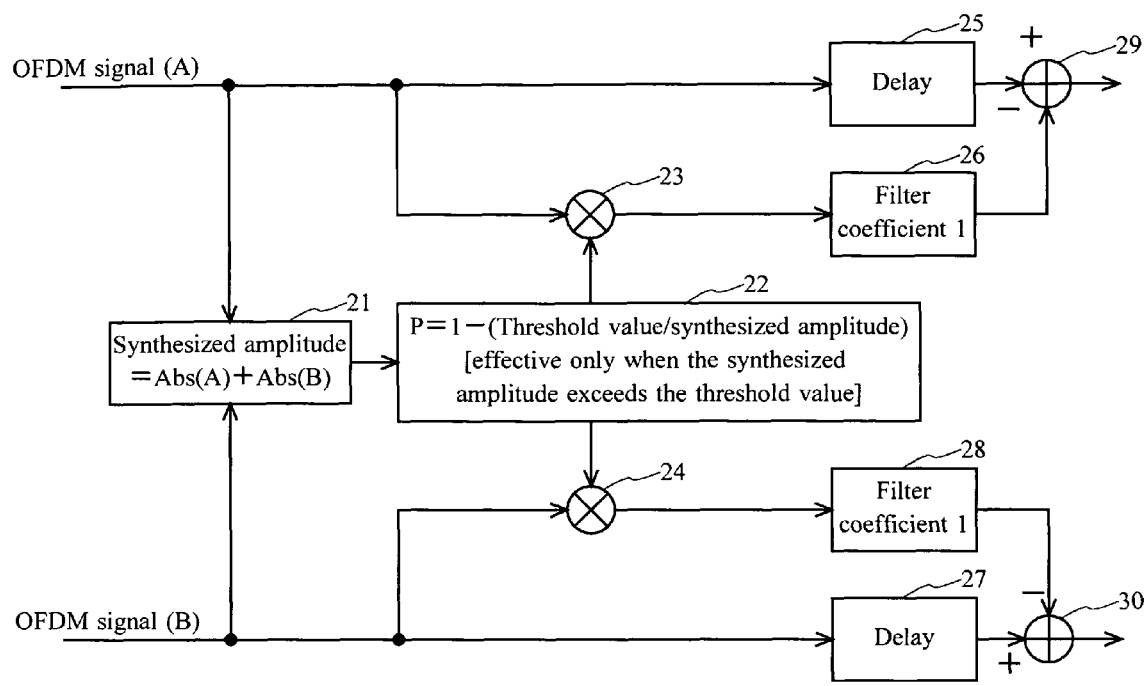
FIG. 2 is a diagram illustrating the constitution of a BB peak-suppressing circuit of the multi-carrier synthesizing type according to the embodiment of the present invention.

FIG. 2 illustrates the constitution of the multi-carrier synthesizing BB peak-suppressing circuit 3 according to the embodiment of the invention.

The BB peak-suppressing circuit 3 of this embodiment includes a synthesized amplitude operation circuit 21, a peak suppress value operation circuit 22, two multiplier circuits 23 and 24, two delay elements 25 and 27, two filters 26 and 28, and two subtracting circuits 29 and 30.

Here, the BB peak-suppressing circuit 3 of this embodiment shown in FIG. 2 may appear to be similar, in basic circuit constitution, to the peak-suppressing circuit 6 of the prior art shown in FIG. 7. However, the formula for operating the synthesized amplitude through the synthesized amplitude operation circuit 21 of this embodiment is different from that of the peak-suppressing circuit 6, the same filter coefficient is set to the filters 26 and 28 of each of the series unlike that of the peak-suppressing circuit 6, and the multiplying circuits 23 and 24 of each of the series multiply the I-signal and the Q-signal of BB (base band) by the same value unlike that of the peak-suppressing circuit 6.

Though this embodiment illustrates the constitution for transmitting two carriers, three or more carriers can be transmitted by adding the same circuits in a number corresponding to the number of the carriers to be transmitted. When one carrier is to be transmitted, the number of circuits can be decreased down to, for example, one. In the constitution of FIG. 2, however, the circuit can be operated without any change by inputting no signal to the carrier side where there is no input.

Described below is the operation of the BB peak suppressing circuit 3 of this embodiment.

OFDM signals of each of the series are input from the OFDM modulators 1 and 2 of each of the series.

The synthesized amplitude operation circuit 21 finds a predetermined synthesized amplitude (estimated value) of the OFDM signal (A) and the OFDM signal (B) input from the OFDM modulators 1 and 2, and outputs it to the peak suppress value operation circuit 22. Here, the synthesized amplitude of this embodiment is obtained by synthesizing the absolute value (Abs) of the OFDM signal (A) and the absolute value (Abs) of the OFDM signal (B), and is expressed by the formula (3), wherein A represents I- and Q-signals in the OFDM signal (A), and B represents I- and Q-signals in the OFDM signal (B).

$$\text{Synthesized amplitude} = Abs(A) + Abs(B) \quad (3)$$

The peak suppress value operation circuit 22 compares the value of the synthesized amplitude obtained by the synthesized amplitude operation circuit 21 with the first threshold value set by the limiter, and outputs a value P (=1−(threshold value/synthesized amplitude)) obtained by the operation of the formula (1) to the multiplier circuits 23 and 24 if the value of the synthesized amplitude is greater than the first threshold value, and outputs a value 0 to the multiplier circuits 23 and 24 if the value of the synthesized amplitude does not exceed the threshold value.

The multiplier circuits 23 and 24 of each of the series multiply the OFDM signals (OFDM signal (A) and OFDM signal (B)) input from the OFDM modulators 1 and 2 of each of the systems by the value (P or 0) input from the peak suppress value operation circuit 22, and outputs the multiplied results to the filters 26 and 28 of each of the series.

Here, the multiplier circuits 23 and 24 of each of the series are constituted as the ones for multiplying the I- and Q-signals by the same filter coefficient to deal with the I- and Q-signals in the OFDM signals.

The filters 26 and 28 of each of the series have a filter coefficient common in all of the series, and have, as filtering frequency characteristics, a coefficient such that the band of the OFDM transmitted signals of BB frequency becomes a pass band. The filters 26 and 28 of each of the series work to filter the signals input from the multiplier circuits 23 and 24 of each of the series, and output them to the subtraction circuits 29 and 30 of each of the series.

In this embodiment as described above, the filters 26 and 28 of each of the series have the common filter coefficient to limit the frequency band in the BB signal band. The multiplier circuits 23 and 24 in each of the series multiply the I- and Q-signals by the same filter coefficients to deal with the I- and Q-signals in the OFDM signals.

The delay elements 25 and 27 of each of the series are for correcting the delays of processing through the filters 26 and 28 of each of the series, i.e., work to delay the OFDM signals (OFDM signal (A) and OFDM signal (B)) input from the OFDM modulators 1 and 2 of each of the series and output them to the subtracting circuits 29 and 30 of each of the series.

The subtracting circuits 29 and 30 of each of the series subtract impulse response signals obtained by multiplying the sample signals input from the filters 26 and 28 of each of the series and are to be suppressed for their peaks by the band limit for transmitted signals, from the original OFDM signals (OFDM signal (A) and OFDM signal (B)) input from the delay elements 25 and 27 of each of the series, and outputs the subtracted results to the IF converter circuits 4 and 5 of each of the series. The signals output to the IF converter circuits 4 and 5 of each of the series are the ones which are suppressed for their peaks while preserving the band of the transmitted signals for each of the series.

The BB peak-suppressing circuit 3 of this embodiment will be described in further detail.

In this embodiment, the following effect is obtained by suppressing the peaks with the BB signals.

That is, the filter length can be shortened by executing the processing prior to the IF conversion (up-sampling). This is because the ratio (specific band) of the band of the transmitted signals and the Nyquist frequency approaches 1. This makes it possible to decrease the additional circuit quantity.

In this embodiment, the following problems 1 to 3 may arouse, which, however, can be overcome in a manner as described below.

(Problem 1) It is difficult to estimate a peak value in the multi-carrier synthesis. Concretely, it is difficult to estimate the phase rotation among the BB sample signals after the IF conversion.

(Problem 2) EVM deteriorates greatly due to suppressing the peaks. This is because each sampling gap is so broad that the signals in that section are all suppressed for their peaks and, therefore, the peaks are suppressed even in a section where no peak is taking place.

(Problem 3) The peaks are regenerated by the interpolation processing by up-sampling after the peaks have been suppressed and, therefore, the PAPR is deteriorated.

The above problem 1, however, is overcome by the synthesized amplitude operation circuit 21.

That is, the synthesized amplitude operation circuit 21 of this embodiment estimates the peak occurring in the IF signal between the BB sample signals in the worst case (i.e., in the case where two IF carriers are synthesized in the same phase). The first threshold value may often be set to be slightly larger than the amplitude value that is to be really limited.

In this constitution, however, the BB sample signals, too, may be suppressed though no peak is really taking place in them, and the EVM may be deteriorated (problem 2 mentioned above).

Figure 3:
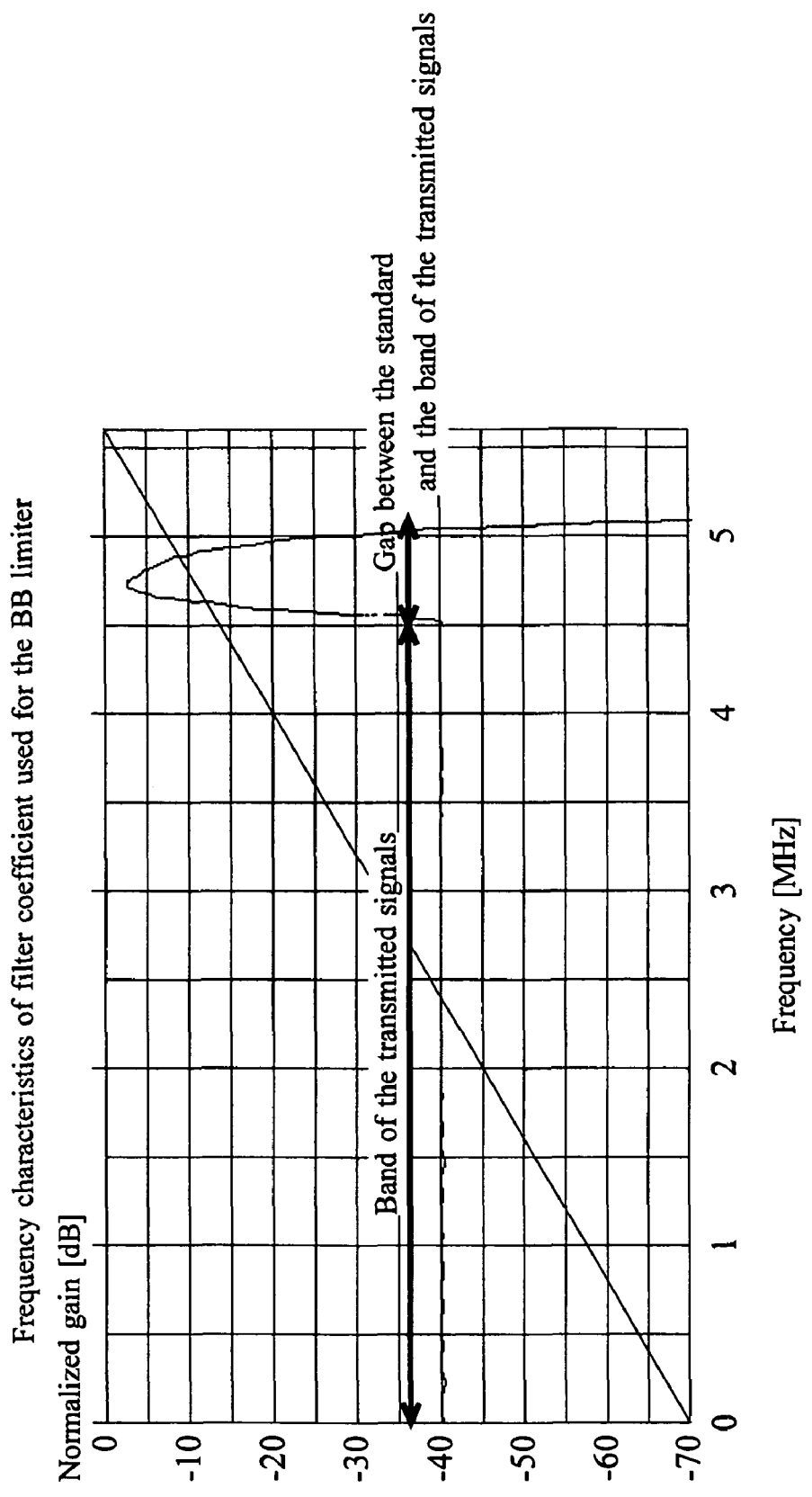
FIG. 3 is a diagram illustrating frequency characteristics of a filter used in a BB limiter.

In this embodiment, therefore, in order to minimize the deterioration of EVM caused by the BB limiter, the frequency characteristics shown in FIG. 3 are employed as frequency characteristics of a filter coefficient of the filters 26 and 28 used in the BB limiter.

FIG. 3 illustrates frequency characteristics of a filter coefficient used in the BB limiter, wherein the abscissa represents the frequency [MHz] and the ordinate represents the normalized gain [dB] (a minimum amount of attenuation was normalized to be about 0 dB).

Figure 4:
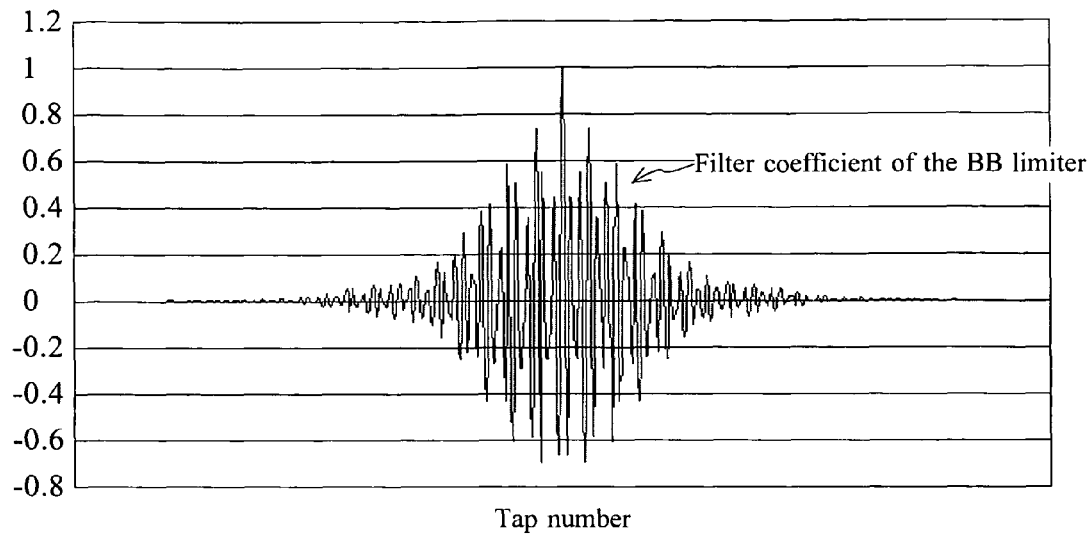
FIG. 4 is a diagram illustrating filter coefficients used in the BB limiter.

FIG. 4 illustrates filter coefficients used for the BB limiter, wherein the abscissa represents the tap numbers of the filter and the ordinate represents the magnitude of the filter coefficient.

In this embodiment as shown in FIG. 3, the frequency characteristics are imparted so as to suppress the signal power in the frequency band occupied by the transmitted signals (transmitted signal band) and to concentrate the power in the gap between the transmitted signal band and the standard of spectrum of the transmitted signals. Therefore, the signals passing through the filter have almost no electric power in the frequency band where the transmitted signal power is present, making it possible to decrease the deterioration of the subcarrier signals. As a result, deterioration of the EVM can be decreased and the above problem 2 can be overcome. Though FIG. 3 illustrates the frequency characteristics so designed as to pass those signals that attenuate by 40 dB through the transmitted signal band, the amount of attenuation may be suitably designed.

In the waveform of filter coefficients shown in FIG. 4, the amplitude is so adjusted that the coefficient assumes a maximum value 1 at the center tap, suppressing the adjacent side lobes. Therefore, the gain in practice exceeds 0 dB in the pass band. In this embodiment, the amounts of delay of the delay elements 25 and 27 are so adjusted that the position of the center tap comes into agreement with the object to be limited, and the subtraction is effected by the subtracting circuits 29 and 30 to suppress the peaks.

Concerning the above problem 3, PAPR is improved by the IF signal limiter (peak-suppressing circuit 6 shown in FIG. 1) in the subsequent stage to solve the problem 3.

Figure 5:
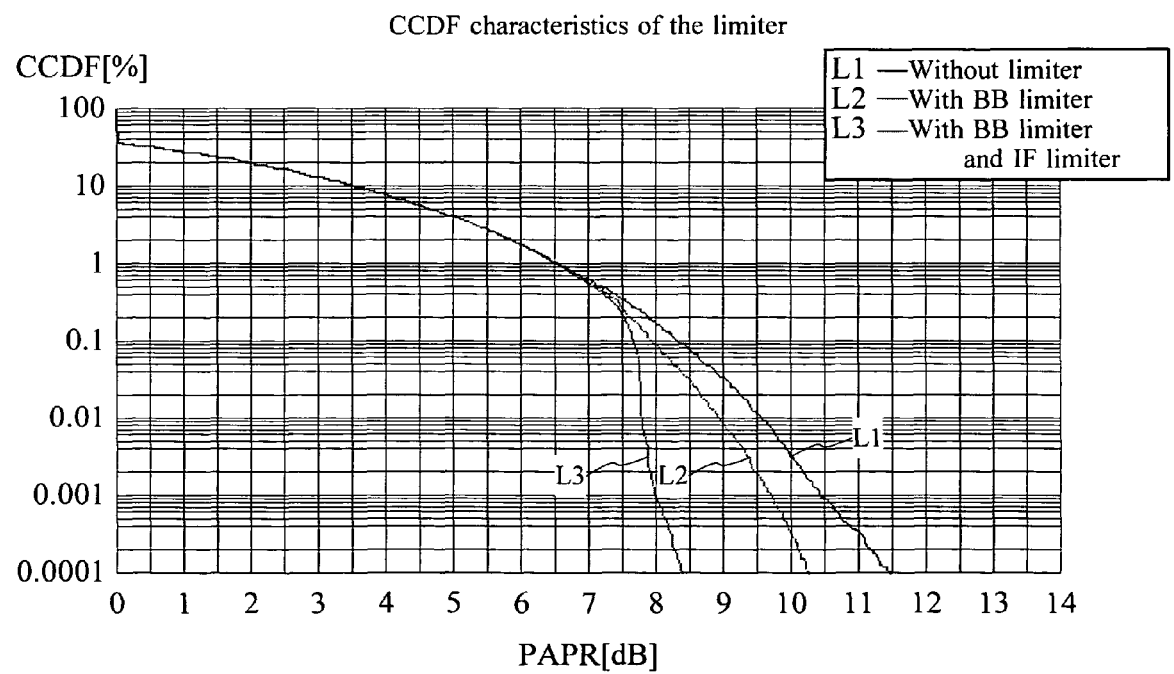
FIG. 5 is a diagram illustrating CCDF characteristics of the limiter.
Figure 6:
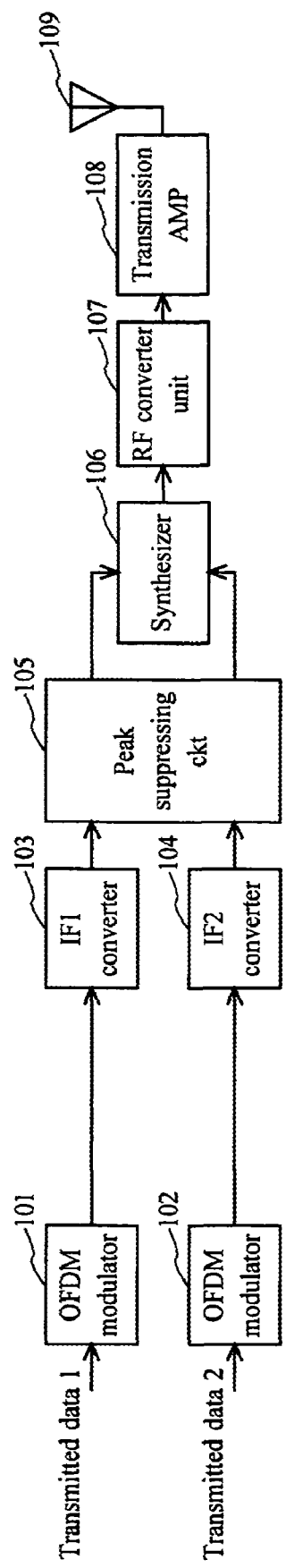
FIG. 6 is a diagram illustrating the constitution of an OFDM transmitter.

FIG. 5 illustrates the characteristics in each of the stages, i.e., CCDF characteristics L1 of when no limiter is used, CCDF characteristics L2 of when the BB limiter (BB peak-suppressing circuit 3) only is used, and CCDF characteristics L3 of when the BB limiter (BB peak-suppressing circuit 3) and the IF limiter (peak-suppressing circuit 6) are used, as examples of characteristics of complementary cumulative distribution function (CCDF) of the limiter. The abscissa represents the PAPR [dB] and the ordinate represents the CCDF [%].

In this embodiment, the BB limiter and the IF limiter are constituted in a multiplicity of stages, suppressing the occurrence of new peaks caused by the addition of peak-suppressing signals, decreasing the dispersion in the suppressing amount and, as a result, suppressing the EVM.

As described above, the communication equipment to which the OFDM system is applied of this embodiment includes the OFDM modulators 1 and 2 for generating one or a plurality of OFDM signals, the BB peak-suppressing circuit 3 which detects a peak value from the estimated synthesized value of the one or the plurality of OFDM signals (a signal value when there is only one OFDM signal) and suppresses the amplitude of the peak value, the IF converter circuits 4 and 5 for converting the one or the plurality of OFDM signals into IF signals to obtain one or the plurality of IF signals, the IF peak-suppressing circuit 6 for detecting peak values of IF signals from the estimated synthesized value of the one or the plurality of IF signals (signal value when there is only one IF signal) and for suppressing the amplitude of the peak value of the IF signals, and the synthesizer 7 for synthesizing the outputs from the IF peak-suppressing circuit 6, and further includes the amplifier 9 for amplifying the output after the peak has been suppressed.

In the communication equipment of this embodiment, further, the BB peak-suppressing circuit 3 includes the filters 26 and 28 which receive peak-suppressing amounts with the synthesized value of absolute values of the one or the plurality of OFDM signals (absolute value of the signal when there is only one OFDM signal) as the estimated peak value and limit the frequency band, the delay elements 25 and 27 for delaying the one or the plurality of OFDM signals, and the subtracting circuits 29 and 30 for suppressing the peaks by subtracting the outputs of the filters 26 and 28 from the outputs of the delay elements 25 and 27.

In the communication equipment of this embodiment, further, the frequency characteristics of the filters 26 and 28 that limit the frequency band are such that a gap between the frequency band possessed by the OFDM signals and the standard of transmission frequency of the transmitter is chiefly used as a pass frequency band.

Therefore, the communication equipment of this embodiment satisfies, for example, the standard of transmission frequency characteristics as well as all of such conditions as low PAPR, small degradation of EVM and small increase in the circuit scale. Therefore, the EVM in the quality of transmitted signals is degraded little, peaks of the OFDM transmitted signals are effectively suppressed, and the consumption of electric power by the amplifier (AMP) can be decreased.

The communication equipment of this embodiment can be preferably employed for a mobile station equipment such as a cell phone in a mobile communication system, for a base station equipment for communication with the mobile station equipment, and for a digital TV broadcasting system.

In the radio communication equipment that uses the OFDM system of this embodiment, means for forming a plurality of OFDM signals is constituted by the functions of the OFDM modulators 1 and 2, means for suppressing peaks of the base band is constituted by the function of the BB peak-suppressing circuit 3, IF converter means that converts the OFDM signals of base band of each of the systems into IF signals is constituted by the functions of the IF converter circuits 4 and 5, IF peak-suppressing means is constituted by the function of the IF peak-suppressing circuit 6, synthesizing means for synthesizing a plurality of OFDM signals (IF signals) is constituted by the function of the synthesizer 7, RF converter means is constituted by the function of the RF converter unit 8, and amplifier means is constituted by the function of the transmission amplifier 9.

In the BB peak-suppressing circuit 3 of this embodiment, further, suppressing amount-forming means is constituted by the function of the synthesized amplitude operation circuit 21, by the function of the peak suppress value operation circuit 22 and by the function of the multiplying circuits 23 and 24 for forming peak-suppressing amounts (input signals to the filters 26 and 28 of each of the series) for the OFDM signals of each of the series. Further, filter means is constituted by the functions of the filters 26 and 28 having frequency characteristics of filter coefficients shown in FIG. 3, and subtraction means is constituted by the function of the subtracting circuits 29 and 30 for subtracting peak-suppressing amounts of each of the series processed through the filters from the OFDM signals of each of the series.

What is claimed is:

1. Communication equipment for transmitting signals of an OFDM system, comprising:
    a forming means for forming a plurality of OFDM signals;
    a peak-suppressing means of a base band for suppressing peaks of the OFDM signals based on the plurality of OFDM signals formed by the forming means;
    an IF converter means for converting each of the OFDM signals of which the peaks are suppressed by the peak-suppressing means of the base band into intermediate-frequency signals;
    a peak-suppressing means of the intermediate frequency for suppressing peaks of the intermediate-frequency signals based on a plurality of intermediate-frequency signals converted by the IF converter means;
    a synthesizing means for synthesizing the plurality of intermediate-frequency signals of which the peaks are suppressed by the peak-suppressing means of the intermediate frequency; and
    an amplifier means for amplifying the signals after synthesized by the synthesizing,
    wherein the peak-suppressing means of the base band suppresses the peaks with the synthesized value of absolute values of the OFDM signals as an estimated peak value, and the peak-suppressing means of the intermediate frequency suppresses the peaks with the absolute value of the result of synthesizing the plurality of intermediate-frequency signals as an estimated peak value.

2. The communication equipment according to claim 1, wherein, the peak-suppressing means of the base band further comprises:
    a suppressing amount-forming means for forming peak-suppressing amounts for each of the OFDM signals based on the plurality of OFDM signals;
    a filter means for limiting the frequency band of each of the peak-suppressing amounts formed by the suppressing amount-forming means and
    a subtraction means for subtracting the peak-suppressing amounts of which the frequency bands are limited by the filter means from each of the OFDM signals,
    wherein the filter means has frequency characteristics such that a gap between the frequency band possessed by the OFDM signals and the standard of the transmission frequency is chiefly used as a pass frequency band.

* * * * *